Jan. 10, 1967  D. F. SIDDALL  3,297,461
REINFORCED PLASTIC SHEETING
Filed May 10, 1963  2 Sheets-Sheet 1

INVENTOR.
DON F. SIDDALL
BY
ATTORNEY

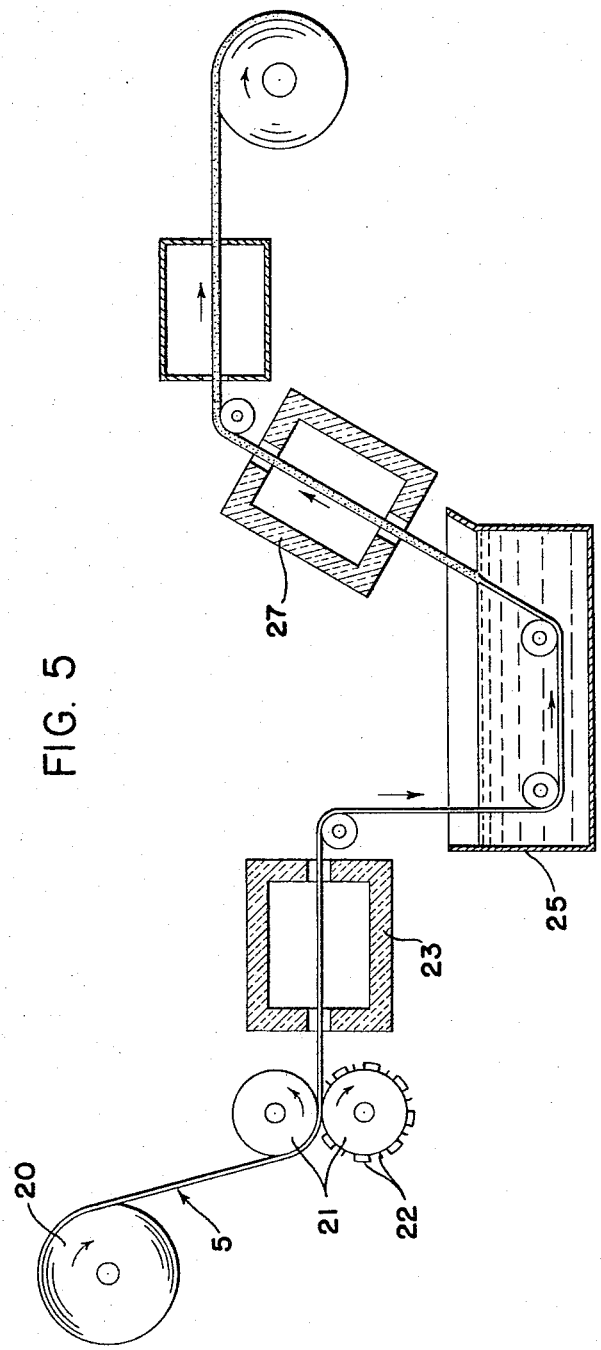

United States Patent Office 3,297,461
Patented Jan. 10, 1967

3,297,461
REINFORCED PLASTIC SHEETING
Don F. Siddall, Akron, Ohio, assignor, by mesne assignments to U.S. Stoneware, Inc., a corporation of Massachusetts
Filed May 10, 1963, Ser. No. 279,367
13 Claims. (Cl. 117—4)

This invention relates to reinforced plastic sheeting, preferably sheeting with a malleable metal reinforcement. It includes the reinforcement and its manufacture as well as the finished sheeting and its manufacture. The reinforced sheeting is designed primarily for use as an inexpensive, serviceable flashing. It may be used on walls, floors and in other places where a permanent, impermeable, reinforced membrane is required.

The reinforcement of this invention is a screen composed of crossed filaments or the like. The filaments are detained in their relative positions in the same way that the wires of a house screen are maintained in position (namely, by frictional contact produced by the interweaving of the stiff wires) or the filaments may be crimped wherever they cross one another, as by subjecting the screen to pressure. Crimping may be desirable if the screen is made of plastic or malleable metal, etc.

Each of the filaments is cut into relatively short lengths and this is done by cutting a small number of adjacent filaments in each of a number of different locations scattered at relatively short intervals over the entire surface of the screen. The cuts may be in straight lines, zigzags, curves, etc. Usually the cuts will be in a pattern that is repeated an indefinite number of times over the entire screen area. Thus, instead of any filament extending the whole length or width of the screen, the screen is composed of relatively short lengths of filaments and, as originally formed, the adjacent lengths cut from any filaments substantially abut one another. The advantage of such a screen, whether used by itself or as a reinforcement is that when tension is applied to it, the lengths can be separated somewhat, or when pressed toward one another the ends of the lengths may be brought together or overlap somewhat. Thus, the sheet is capable of being stretched or compressed a small amount in any direction, and any one portion of the sheet can be stretched or compressed without affecting any other portion. There are short continuous lengths of filaments adjacent each end of each cut which limit the extent of the spread along any cut. Thus although the screen can be stretched locally in any direction, the amount that it can be stretched is limited.

The filaments may be of plastic, glass fiber (which may be heat resistant), or metal. They are preferably of annealed metal so that when deformed they have no memory which tends to make them return to their original flat shape, but they indefinitely retain any shape imposed upon them.

Plastic may be applied to one or both surfaces of the screen and adhered thereto. When desirable, the screen may be encapsulated in the plastic. This plastic may be of a type usually employed for roofing such as a vinyl or asphalt or a composite sheet. For roofing or other purposes, the plastic may be polyethylene, polypropylene, rubber (applied to the screen from solution, from latex, or from a molten mass), or from blends such as vinyl-asphaltic compositions, rubber-asphaltic compositions, etc. The plastic may include other materials than the screen, such as clay, short asbestos fibers, fungicides, bacteriostats, etc. The screen and plastic covering are preferably coextensive. Ordinarily no adhesive is required to adhere the screen to the plastic and if the screen is sandwiched between two plies of the plastic the two plies are united to one another and hold the screen between them. The plastic may be applied to the screen by casting, dipping, spreading, knife-coating, or other suitable means, and this will be followed by curing or fusing or other treatment, if any, which is necessary to set or otherwise change the plastic.

In a preferred method of preparing the product, a vinyl plastic is preferably used in the form of a plastisol which on heating converts to a solid membrane or covering. Suitable formulae will include, for example, the following ingredients, the figures representing parts by weight and including maximum and minimum and preferred amounts of each ingredient:

| | Minimum | Preferred | Maximum |
|---|---|---|---|
| Polyvinyl Chloride (dispersion or plastisol grade) | 50 | 80 | 100 |
| Polyvinyl Chloride (suspension grade) | 50 | 20 | 0 |
| Polymeric Plasticizer | 200 | 100 | 30 |
| Fire Retardant | 50 | 8 | 0 |
| Fungicide, Antioxidant, etc | 2 | 1 | 0 |
| Pigment | 100 | 6 | 0 |
| Thickening or Gelling Agent | 20 | 2 | 0 |
| Filler | 200 | 0 | 0 |
| Stabilizer | 10 | 4 | 0 |

NOTE.—The polymeric plasticizer is a polyester with a molecular weight between 1,000 and 4,000 and a specific gravity of 1.0 to 1.12 at 20° C./20° C. The fire retardant may be antimony oxide. A satisfactory fungicide is o-phenylphenol. The pigment used to make a black material for roofing may be a paste of 75 percent biphenyl diphenyl phosphate and 25 percent carbon black. The thickening or gelling agent used with a vinyl plastic may be air-floated silica, montmorillonite of the expanding lattice type, etc. Filler may be used to control viscosity or reduce cost, etc., and for such purposes calcium carbonate, clays, etc. may be used. With vinyl compositions it may be desirable to use any of the usual stabilizers such as organo lead compounds, lead salts, such as dibasic lead phosphate, etc.

The composition of the plastic may vary over a wide range, depending upon the use to which the product is to be put, etc.

The screen is preferably annealed so that it may be bent to a desired shape, and retain that shape. The annealed screen has no memory. The screen may be annealed in a separate operation, or it may be annealed as a step in the continuous production of flashing, etc. from unannealed screen. In the latter case, the residual heat remaining in the screen from the annealing operation may assist in the pick-up and deposition of the plastisol on to the screen.

In applying flashing to a roof it is necessary to bend the flashing to accommodate it to the curves in the surface of the roof, and it may be desirable to localize the bend. In fact, it may be necessary to bend adjacent areas in different directions which can only be done by stretching the flashing. This is not possible with the usual reinforced flashings but is readily accomplished with the improved flashing of this invention. At one place this flashing may be bent at a concave angle, as between a chimney and the roof, and an adjacent area of the same flashing may be bent at a reverse angle, as, for example, at a corner of a chimney or over the ridge of a roof. The flashing of this invention is particularly adapted for such use, especially if the screen is of an annealed metal or of other material which has no memory.

The fact that a localized area of the flashing may be stretched is an advantage, and it is also an advantage that the amount that any area can be stretched is limited. It is a further advantage that in shaping the flashing it can be compressed somewhat when this is desired, and an adjacent area may be stretched. When stretched or compressed, the product which is ductile and malleable because it is made from annealed screen, retains its shape and position because it has no memory.

A reinforcement of metal screen that has not been annealed is apt to have a memory such that in time the metal will tend to assume its original shape and may pull away from a surface to which it has previously been shaped. The annealed metal reinforcement has no such memory.

The invention is further described in connection with the accompanying drawings, in which:

FIGURE 5 is a flow sheet which illustrates the process schematically.

Figure 1:
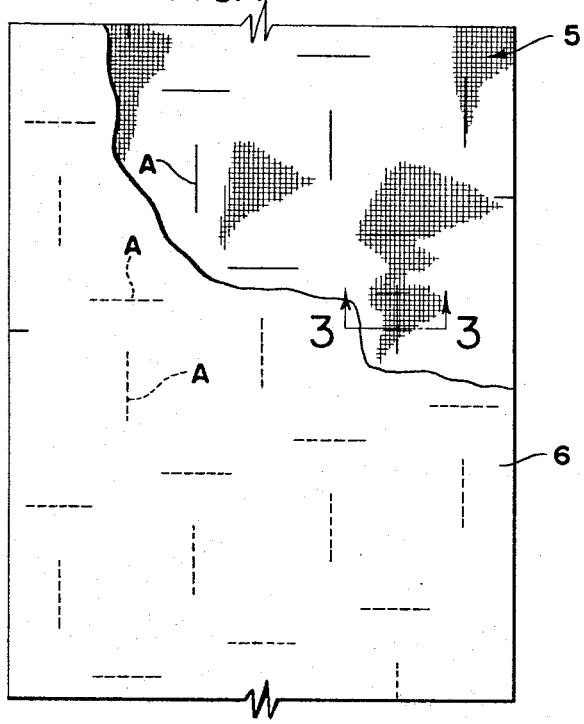
FIGURE 1 is a top view of sheeting with plastic on each side of a reinforcing screen with a part of the plastic on one side of the screen removed to show the screen.
Figure 2:
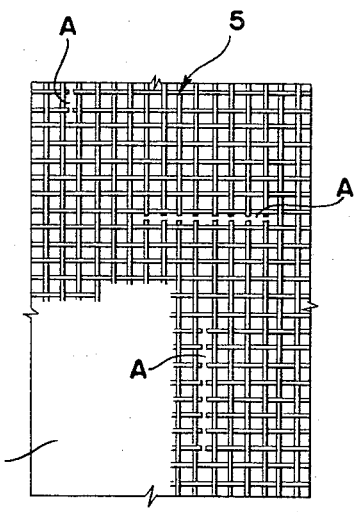
FIGURE 2 is an enlarged view of a section of the screen with a part broken away to show the plastic underneath it.
Figure 3:
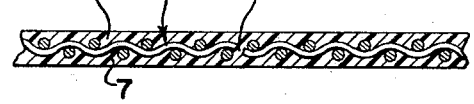
FIGURE 3 is a section through the reinforced screen on the line 3—3 of FIGURE 1.

FIGURES 1 to 3 are views of sheeting composed of a reinforced screen 5 with plastic sheets 6 and 7 on opposite sides of the screen. The two plastic sheets are adhered to one another and hold the screen between them. The plastic 6 may be of the same composition as the plastic 7, or they may be of different compositions. The screen 5 is preferably of annealed aluminum or other metal.

FIGURE 1 shows the sheet with a portion of the top plastic 6 removed to show the screen 5. FIGURE 2 is an enlarged view showing the screen 5 with the plastic 7 beneath it.

The filaments which compose the screen are cut into lengths at a plurality of different locations indicated by the letter A. The filaments from which the screen is composed are at right angles to one another so that although many of the locations A are parallel to one another, there are just as many at right angles to one another. Ordinarily the cuts will be made perpendicularly across the filaments, but they may be made any shape and on a bias at an angle.

At each of the locations A, a plurality of the filaments have been cut. The number cut is relatively small compared to the entire length or width of the sheet. Furthermore, the distance between the locations A is relatively short compared to the dimensions of the sheet. It is noted that the cuts A are staggered so that no two cuts are aligned with one another in locations adjacent to one another.

The enlargement in FIGURE 2 shows clearly that the cuts A extend across eight adjacent filaments, for example. The number may be somewhat less or somewhat more. At both ends of each cut the distance the cut filaments can be separated is limited by the adjacent uncut filaments. All of the cuts indicated by the letters A may be made at one time, but preferably they are made by rolling a long strip of the screen between two rollers conveniently associated with cutting means to make cuts longitudinal to one another, and others perpendicular to these as the screen is passed between the rollers.

In referring to FIGURE 1, it will be seen that if tension is applied to opposite sides of the sheet of flashing there shown, at any one particular location along the two side edges, the flashing can be stretched by separating the cut ends of the filament slightly, and this tension need not be applied perpendicularly to the edges but may be applied at an angle. It will further be noted that although the cut ends can be separated, the adjacent filaments which are not cut limit the extent to which these cut ends can be separated. Thus, a limited area of the sheet can be elongated a limited amount in any direction. The adjacent areas need not be stretched, or they may be stretched to a greater or less extent, or they may be compressed by pushing the cut ends into overlapping relation.

Also, by compressing any limited area of the two edges, the cut ends of the filaments can be brought into contact or may even be overlapped to a small extent, depending upon the nature of the encapsulating plastic, so that a dimension of the flashing can be reduced from that of the original uncut sheet.

Thus limited areas of the sheet can be stretched or compressed, regardless of whether the adjoining areas are stretched or compressed, or are permitted to retain their original dimensions.

Figure 4:
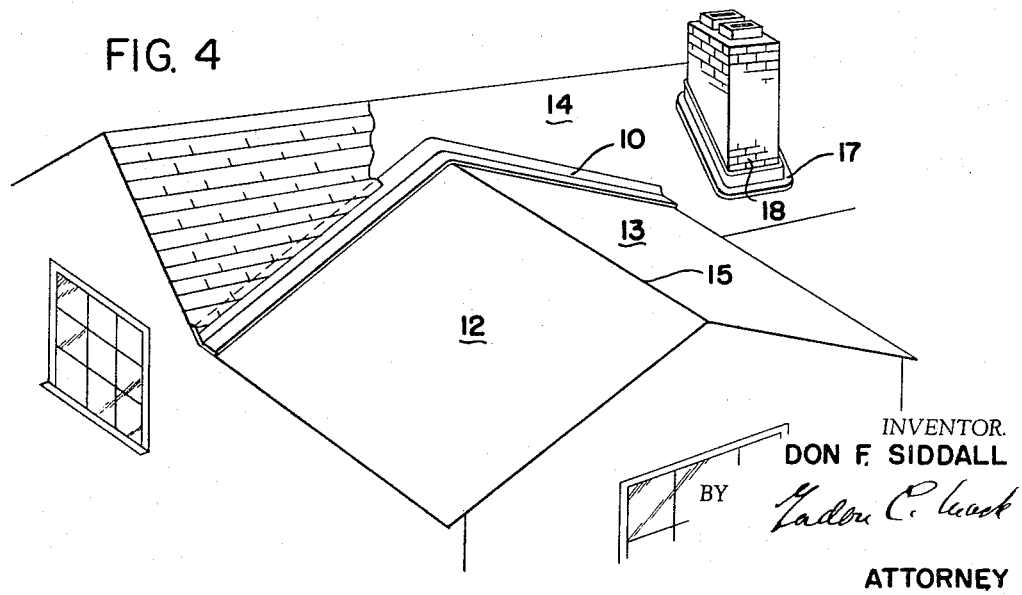
FIGURE 4 illustrates the use of the flashing on a roof.

FIGURE 4 illustrates a portion of a roof of a dwelling with a flashing 10 over the roof areas 12 and 13 of a wing of the dwelling where they abut the main roof 14. The reinforced sheeting is admirably suited for use as flashing. In addition to other advantages explained in connection with FIGURE 4, expansions and contractions of the reinforcement due to changes in temperature inside or outside of the building do not affect the over-all dimensions of the flashing.

The flashing is laid over the ridge 15 between the two roof areas 12 and 13. The portion of the flashing which lies flat on the roof 14 adjacent the ridge 15 is necessarily extended beyond the adjacent portions which lie flat on the roof areas 12 and 13. This is easily accomplished with the flashing of this invention. The portion 10 is stretched in line with the ridge 15 and lies flat on the roof 14. If this flashing is reinforced with annealed metal screen there will be no tendency for the flashing to change shape on aging. It will continue to lie flat against the roof surface to provide a permanent water-tight, weather-proof joint.

Similarly, a strip of flashing 17 may be laid flat on the roof with another portion flat on the chimney surface 18, with the flashing stretched as required at the corners of the chimney. The extent that different portions can be stretched, etc., depends upon the screen and how it has been cut, and also upon the plastic.

FIGURE 4 illustrates only certain uses of the new reinforced flashing. It can be shaped in and around a depression where a roof drain is located. It can be shaped up over the edge of a parapet at the edge of an expansive roofing. It can be shaped around a vent stack and will not tend to pull away from the stack due to any memory, if the metal reinforcement has been annealed and there is normal adhesive attachment such as is obtained by roofing oils, etc. Thus, it can be shaped to a wide variety of different contours and will remain permanently in place when post bonded.

In all other respects it will be utilized as any other flashing, and shingles, tar paper, etc., may be placed over it, as illustrated in FIGURE 4.

One procedure for producing a reinforced sheet coated with the foregoing vinyl compound, or other plastic, is illustrated in FIGURE 5. It includes provision for annealing a screen made of aluminum or other annealable metal. The annealing oven may be omitted.

The screen is unrolled from the stock roll 20, passed through rolls 21 where short longitudinal and lateral cuts are made in the screen by suitable knives 22 on one roll which enter slots (not shown) in the other roll. The screen is then passed through the annealing oven 23, which for aluminum screen is hot enough to heat the screen to 650° to 950° F.

The oven 23 is omitted if the screen is annealed before dipping, or it is omitted if ductility is not required.

From here the screen enters the dipping bath 25 which contains the plasticized vinyl composition which is usually at room temperature. The heat in the wire as it leaves the annealing oven assists in heating the vinyl bath. Here the screen picks up a thick layer of plastic, filling the openings in the screen completely. If a vinyl plastic is used, the sheet then passes through the fusing chamber 27 where it is heated under conditions usual for fusing, such as a temperature of 400° F. to 600° F. for 2 to 5 minutes, depending upon the type of plastic, rate of travel, etc., converting the plastic from a viscous liquid or semi-solid gel into a solid. The sheet is then cooled in the air or by passing over or between chilled rolls, or by spraying with water, or in any other suitable manner, and when sufficiently cool it is rolled, or cut to lengths and packaged, or disposed of in any suitable manner. A second dip may be used to increase the thickness of the plastic coating.

If desirable, the first dip may merely coat the wire, and a second dip of the same or a different material will then be used to build up a desired coating. Alternatively, the coating is applied by laminating a preformed sheet or sheets to the screen which may be first coated with an adhesive.

Various properties and advantages of the reinforced plastic sheet, particularly when used as flashing, and the procedure may be summarized as follows:

(1) Flexibility, to accommodate the forming of contours, corners, edges, and asymmetrical shapes.

(2) Elasticity to allow for extremes of expansion and contraction while installed, flexibility in the plastic and the cut pattern of the screen to interrupt total extension of the screen.

(3) Malleability, to eliminate the plastic memory when forming to various contours, so that when once formed to a shape, the shape is retained until more permanently fastened into position.

(4) Strength and resistance to tensile pull, tear resistance, and puncture due to the internal reinforcement of the screen.

(5) The plastic composition, if vinyl, resists the solvating and extracting action of hot roofing tar, and is resistant to migration of plasticizer, etc., from the plastic to the roofing tar causing a viscous boundary layer with loss of bonding strength.

(6) The plastic composition may be compounded to be flexible at extremely low temperatures which permits handling, storage, and installation at freezing temperatures without cracking.

(7) The plastic composition may embody self-extinguishing properties and ingredients which protect the life of the sheeting by the use of strong fungicides and bacteriostats.

(8) The process of casting and fusing permits latitude in creating various thicknesses, colors, weights of reinforcements, widths, and lengths, eliminating the hazards of built-in stresses and strains, by coating, dipping, spreading, pumping or spraying, etc., followed by heat fusion if vinyl plastic is used.

(9) The process involves standard processing equipment and does not require expensive machinery nor controls.

The invention is covered in the claims which follow.

What I claim is:

1. A screen composed of crossed, spaced, parallel relatively inextensible filaments, each filament being divided into segments which are relatively short compared to the dimensions of the screen by lines of separation each of which extends through a number of adjacent filaments, said number being relatively small compared to the number of filaments parallel thereto, said lines of separation being scattered throughout the area of the screen so that in all directions all filaments are interrupted and are thereby extensible, whereby the screen is extensible in all directions.

2. A screen composed of spaced, parallel, relatively inextensible filaments which cross one another at right angles, all of said filaments being separated into lengths which are relatively short compared to the dimensions of the screen by lines of separation each of which extends through a number of adjacent filaments, said number being relatively small compared to the number of filaments parallel thereto, said lines of separation being scattered throughout the area of the screen.

3. The screen of claim 1 at least one surface of which is covered with a layer of elastomer adhered thereto.

4. The screen of claim 2 at least one surface of which is covered with a vinyl layer.

5. The screen of claim 1 embedded in an elastomer layer and adhered thereto.

6. The screen of claim 2 embedded in a vinyl layer and adhered thereto, the screen and layer being substantially coextensive.

7. The screen of claim 1 in which the filaments are metal.

8. The screen of claim 2 in which the filaments are annealed aluminum.

9. The screen of claim 2 in which the filaments are annealed metal and both surfaces of the screen are coated with a layer of vinyl composition substantially coextensive with the screen.

10. The method of treating a screen of crossed, parallel filaments, which method comprises cutting all of the filaments into sections which are relatively short compared to their original length, by cutting across a number of adjacent filaments at a plurality of locations in the screen scattered throughout the area of the screen, said number being relatively small compared with the total number of filaments parallel thereto, the adjacent filaments at each location being cut substantially simultaneously.

11. The method of treating a screen as in claim 10, which is followed by coating at least one surface of the screen with a plastic.

12. The method of claim 10 in which the screen is aluminum and it is annealed and while still hot it is dipped in a plastic.

13. The method of claim 10 in which the screen is aluminum and it is annealed and while still hot is dipped in a vinyl composition and then heated to fuse the vinyl composition.

No references cited.

ALFRED L. LEAVITT, *Primary Examiner.*

W. L. SOFFIAN, *Assistant Examiner.*